(12) United States Patent
Golic

(10) Patent No.: US 8,611,219 B2
(45) Date of Patent: Dec. 17, 2013

(54) METHOD OF DETECTING ANOMALIES IN A COMMUNICATION SYSTEM USING SYMBOLIC PACKET FEATURES

(75) Inventor: Jovan Golic, Turin (IT)

(73) Assignee: Telecom Italia S.p.A., Milan (IT)

( * ) Notice: Subject to any disclaimer, the term of this patent is extended or adjusted under 35 U.S.C. 154(b) by 630 days.

(21) Appl. No.: 12/811,202

(22) PCT Filed: Dec. 31, 2007

(86) PCT No.: PCT/EP2007/011474
§ 371 (c)(1),
(2), (4) Date: Jun. 29, 2010

(87) PCT Pub. No.: WO2009/086843
PCT Pub. Date: Jul. 16, 2009

(65) Prior Publication Data
US 2010/0284282 A1 Nov. 11, 2010

(51) Int. Cl.
*H04L 12/56* (2011.01)

(52) U.S. Cl.
USPC .............. 370/235; 370/252; 726/13; 726/26

(58) Field of Classification Search
USPC .............................. 370/235, 252; 726/13, 26
See application file for complete search history.

(56) References Cited

U.S. PATENT DOCUMENTS

| | | |
|---|---|---|
| 6,601,014 B1 | 7/2003 | Dempsey |
| 7,272,853 B2 | 9/2007 | Goodman et al. |
| 7,665,131 B2 | 2/2010 | Goodman et al. |
| 8,069,182 B2 | 11/2011 | Pieper |
| 2003/0200441 A1 | 10/2003 | Jeffries et al. |
| 2004/0220984 A1 | 11/2004 | Dudfield et al. |
| 2005/0022008 A1 | 1/2005 | Goodman et al. |
| 2007/0118904 A1 | 5/2007 | Goodman et al. |
| 2007/0280114 A1 | 12/2007 | Chao et al. |

FOREIGN PATENT DOCUMENTS

WO   WO 2007/002838 A2   1/2007

OTHER PUBLICATIONS

International Search Report from the European Patent Office for International Application No. PCT/EP/2007/011474, mailed Sep. 25, 2008.
Barford et al.; "Characteristics of Network Traffic Flow Anomalies", Proceeding of the $1^{st}$ ACM SIGCOMM Workshop on Internet Measurements, San Francisco, CA, pp. 69-73, (2001).
Peng, T. et al., "Proactively Detecting Distributed Denial of Service Attacks Using Source IP Address Monitoring," Proceedings of Networking 2004, Lecture Notes in Computer Science, vol. 3042, pp. 771-782, (2004).

(Continued)

*Primary Examiner* — John Blanton
*Assistant Examiner* — Jay P Patel
(74) *Attorney, Agent, or Firm* — Finnegan, Henderson, Farabow, Garrett & Dunner, L.L.P.

(57) ABSTRACT

A method of detecting anomalies in a communication system includes: providing a first packet flow portion and a second packet flow portion; extracting samples of a symbolic packet feature associated with a traffic status of the first and second packet flow portions; computing from the extracted samples a first statistical concentration quantity and a second statistical concentration quantity of the symbolic feature associated with the first and second packet flow portions, respectively; computing from the concentration quantities a variation quantity representing a concentration change from the first packet flow portion to the second packet flow portion; comparing the variation quantity with a comparison value; and detecting an anomaly in the system in response to the comparison.

23 Claims, 6 Drawing Sheets

(56) References Cited

OTHER PUBLICATIONS

Lakhina, A. et al., "Mining Anomalies Using Traffic Feature Distributions," Proceedings of SIGCOMM '05, Philadelphia, PA, pp. 217-228, (2005).
Wagner, A. et al., "Entropy Based Worm and Anomaly Detection in Fast IP Networks," Proc. 14. IEEE International Workshops on Enabling Technologies Infrastructure for Collaborative Enterprises, Linköping, Sweden, pp. 172-177, (2005).
Haraldsson, E., "DDoS Attack Detection Based on Netflow Logs," Student Thesis SA-2003.35, Swiss Federal Institute of Technology, Zurich, 23 pages, (2003).
Weisskopf, A., "Plug-ins for DDoS Attack Detection in Realtime," Semester Thesis SA-2004.19, Swiss Federal Institute of Technology, Zurich, 3 pages, (2004).
Kumar, K. et al., "A Distributed Approach Using Entropy to Detect DDoS Attacks in ISP Domain," International Conference on Signal Processing, Communications and Networking, pp. 331-337, (2007).
Liying, L. et al., "DDoS Attack Detection Algorithms Based on Entropy Computing," Information and Communications Security, vol. 4861, No. 12, pp. 452-466, (2007).
Feinstein, L. et al., "Statistical Approaches to DDoS Attack Detection and Response," Proceedings DARPA Information Survivability Conference and Exposition, IEEE Compu, vol. 1, pp. 303-314, (2003).
EPO International Search Report for PCT/EP2007/011473, mailed Oct. 10, 2008.
Li et al., "DDoS Detection and Wavelets," Telecommunication Systems-Modeling, Analysis, Design and Management, vol. 28, Nos. 3-4, pp. 435-451, (2002).
Ye et al., "EWMA Techniques for Computer Intrusion Detection Through Anomalous Changes in Event Intensity," Qual. Reliab. Engng. Int., vol. 18, pp. 443-451, (2002).
Okabe et al., "Statistical Traffic Identification Method Based on Flow-Level Behavior for Fair VoIP Service," Proceedings of the $1^{st}$ IEEE Workshop on VoIP Management and Security, Vancouver, Canada, p. 33-38, (2006).
Mandjes et al., "Load Characterization and Anomaly Detection for Voice Over IP Traffic," IEEE Transactions on Neural Networks, vol. 16, No. 5, pp. 1019-1026, (2005).
Murray et al., "Bandwidth Estimation: Metrics, Measurement Techniques, and Tools," IEEE Network, IEEE Service Center, New York, vol. 17, No. 6, pp. 27-35, (2003).
Ishida et al., "Fairness and Utilization in Multipath Network Flow Optimization," IEEE International Conference on Industrial Informatics, pp. 1096-1101, (2006).
Li et al., "On the Effectiveness of DDoS Attacks on Statistical Filtering," $24^{th}$ Annual Joint Conference of the IEEE Computer and Communications Societies, vol. 2, pp. 1373-1383, (2005).
"Communication Under Rule 71(3) EPC", Intention to Grant by European Patent Office dated Dec. 28, 2010 in corresponding European Application No. 07 857 164.3-2416.

METHOD OF DETECTING ANOMALIES IN A COMMUNICATION SYSTEM USING SYMBOLIC PACKET FEATURES

CROSS REFERENCE TO RELATED APPLICATION

This application is a national phase application based on PCT/EP2007/011474, filed Dec. 31, 2007, the content of which is incorporated herein by reference.

BACKGROUND

1. Technical Field

The present invention relates to anomaly detection on packet switched communication systems. Particularly, the present invention is related to statistical methods for detecting network traffic anomalies due to network attacks or to communication system failures.

2. Description of the Related Art

Several types of attacks are known, such as: (distributed) denial of service ((D)DoS) attacks, scanning attacks, SPAM or SPIT attacks, and malicious software attacks.

Denial-of-Service (DoS) attacks and, in particular, distributed DoS (DDoS) attacks are commonly regarded as a major threat to the Internet. A DoS attack is an attack on a computer system or network that causes a loss of service or network connectivity to legitimate users, that is, unavailability of services. Most common DoS attacks aim at exhausting the computational resources, such as connection bandwidth, memory space, or CPU time, for example, by flooding a target network node by valid or invalid requests and/or messages. They can also cause disruption of network components or disruption of configuration information, such as routing information, or can aim at disabling an application making it unusable. In particular, the network components (e.g., servers, proxies, gateways, routers, switches, hubs, etc.) may be disrupted by malicious software attacks, for example, by exploiting buffer overflows or vulnerabilities of the underlying operating system or firmware.

A DDoS attack is a DoS attack that, instead of using a single computer as a base of attack, uses multiple compromised computers simultaneously, possibly a large or a very large number of them (e.g., millions), thus amplifying the effect. Altogether, they flood the network with an overwhelming number of packets which exhaust the network or application resources. In particular, the packets may be targeting one particular network node causing it to crash, reboot, or exhaust the computational resources. The compromised computers, which are called zombies, are typically infected by malicious software (worm, virus, or Trojan) in a preliminary stage of the attack, which involves scanning a large number of computers searching for those vulnerable. The attack itself is then launched at a later time, either automatically or by a direct action of the attacker.

(D)DoS attacks are especially dangerous for Voice over IP (VoIP) applications, e.g., based on the Session Initiation Protocol (SIP). In particular, the underlying SIP network dealing only with SIP signaling packets is potentially vulnerable to request or message flooding attacks, spoofed SIP messages, malformed SIP messages, and reflection DDoS attacks. Reflection DDoS attacks work, as an example, by generating fake SIP requests with a spoofed (i.e. simulated) source IP address, which falsely identify a victim node as the sender, and by sending or multicasting said SIP requests to a large number of SIP network nodes, which all respond to the victim node, and repeatedly so if they do not get a reply, hence achieving an amplification effect.

SPAM attacks consist in sending unsolicited electronic messages (e.g., through E-mail over the Internet), with commercial or other content, to numerous indiscriminate recipients. Analogously, SPIT (SPam over Internet Telephony) attacks consist in sending SPAM voice messages in VoIP networks. Malicious software attacks consist in sending malicious software, such as viruses, worms, Trojan, or spyware, to numerous indiscriminate recipients, frequently in a covert manner. Scanning or probing attacks over the Internet consist in sending request messages in large quantities to numerous indiscriminate recipients and to collect the information from the provoked response messages, particularly, in order to detect vulnerabilities to be used in subsequent attacks. For example, in port scanning attacks, the collected information consists of the port numbers used by the recipients.

Attack detection techniques are known which utilize a description (signature) of a particular attack (e.g., a virus, worm, or other malicious software) and decide if the observed traffic data is consistent with this description or not; the attack is declared in the case of detected consistency.

Furthermore, anomaly detection techniques are known which utilize a description (profile) of normal/standard traffic, rather than anomalous attack traffic, and decide if the observed traffic data is consistent with this description or not; an attack or anomalous traffic is declared in the case of detected inconsistency.

Unlike attack detection techniques, anomaly detection techniques do not require prior knowledge of particular attacks and as such are in principle capable of detecting previously unknown attacks. However, they typically have non-zero false-negative rates, in a sense that they can miss to declare an existing attack. They also typically have higher false-positive rates, in a sense that they can declare anomalous traffic in the case of absence of attacks.

Anomaly detection techniques can essentially be classified into two categories: rule-based techniques and statistic-based or statistical techniques. Rule-based techniques describe the normal behavior in terms of certain static rules or certain logic and can essentially be stateless or stateful. In particular, such rules can be derived from protocol specifications.

On the other hand, statistical anomaly detection techniques describe the normal behavior in terms of the probability distributions of certain variables, called statistics, depending on the chosen data features or parameters.

Paper "Characteristics of network traffic flow anomalies," P. Barford and D. Plonka, Proceedings of the 1st ACM SIGCOMM Workshop on Internet Measurement, San Francisco, Calif., November 2001, pp. 69-73, suggests that packet rate, byte rate, and flow rate (i.e., the number of packets, bytes, and flows per second) curves in time can be useful for detecting and classifying traffic anomalies, possibly through the wavelet transform techniques.

US-A-2003/0200441 describes a method for detecting (D)DoS attacks based on randomly spoofed (i.e., simulated) IP addresses. To reduce the number of IP addresses, they are first hashed by a hash function. The method consists of counting the relative number of different values of hashed IP addresses among a number of packets, which are inspected successively in time, and of comparing this number with a predetermined threshold. A (D)DoS attack is declared if the threshold is exceeded. The number of inspected packets is iteratively increased if a (D)DoS attack is not detected.

Article "Proactively detecting distributed denial of service attacks using source IP address monitoring", T. Peng, C. Leckie, and K. Ramamohanarao, Proceedings of Networking 2004, Lecture Notes in Computer Science, vol. 3042, pp. 771-782, 2004, discloses a method according to which DDoS attacks can be (proactively) detected even near the sources of the attack by checking for an increase of new source IP addresses appearing, provided that the source IP addresses of the attack traffic are randomly spoofed. It should be noticed that according to this article the IP addresses are monitored in non-overlapping time intervals and the increase is measured with respect to a database of legitimate IP addresses collected during off-line training.

Paper "Mining anomalies using traffic feature distributions", A. Lakhina, M. Crovella, and C. Diot, Proceedings of SIGCOMM '05, Philadelphia, Pa., Aug. 22-26, 2005, pp. 217-228, discloses a method comprising a step of computing the "sample entropy" of discrete packet features such as IP addresses and port numbers, in non-overlapping, relatively short time intervals (e.g., 5 min), to statistically model the multidimensional entropy data collected on multiple links in a communications network by using the principal component analysis, and then to verify if the current data is inconsistent with the model determined by checking if the squared prediction error, resulting from the principal component analysis exceeds a threshold. The Applicant observes that the sample entropy used is based on the well-known Shannon entropy. It is expected that the frequency distribution of the IP addresses or port numbers reflected in the sample entropy should change in the case of an attack traffic. The Applicant observes that the same method is later proposed in WO-A-2007/002838.

Article "Entropy based worm and anomaly detection in fast IP networks", A. Wagner and B. Plattner, Proc. 14. IEEE International Workshops on Enabling Technologies Infrastructure for Collaborative Enterprises, Linköping, Sweden, June 2005, pp. 172-177, discloses a method considering discrete packet features such as IP addresses in relatively short time intervals (e.g., 5 min) and to compress a concatenation of all the IP addresses occurring in the interval by a lossless data compression algorithm, such as the Lempel-Ziv coding algorithm. It is expected that the compression ratio should be lower if there is an attack traffic in the interval, due to randomization of destination IP addresses.

Thesis "DDoS attack detection based on Netflow logs", E. Haraldsson, Student thesis SA-2003.35, Swiss Federal Institute of Technology, Zurich, 2003, and thesis "Plug-ins for DDoS attack detection in realtime," A. Weisskopf, Semester thesis SA-2004.19, Swiss Federal Institute of Technology, Zurich, 2004, disclose a number of packet statistics for the detection of DDoS attacks. The statistics examined by Haraldsson include the number of open or half-open (obtained from TCP flags) connections, the number of transmitted or received bytes per (grouped) IP address, the number of open ports per (grouped) IP address, and the histogram of the average packet sizes, while the statistics examined by Weisskopf include the histogram of the flow sizes in bytes over a time period and the activity of (grouped) IP addresses.

BRIEF SUMMARY

The Applicant has observed that the known solutions are not satisfactory with respect to the achieved false-negative and false-positive rates and the computational complexity and memory requirements. This could be due to the fact that it is difficult for the normal traffic in communications networks to be described by stable probability distributions. Moreover, it is difficult to define statistical models of communication systems that would give rise to sufficiently low false-positive and false-negative rates. It should be also noticed that the complexity of the proposed statistical methods may be unacceptably high for high-speed and high-volume communications networks.

The Applicant has noticed that there is a need in the field for achieving an anomaly detection method providing increased reliability and, preferably, reduced computational complexity and memory requirements. In accordance with a particular embodiment, the Applicant has observed that advantages can be obtained by monitoring the statistical behavior of symbolic packet features associated with two packet flow portions lying in corresponding time windows that are moving in time.

A symbolic packet feature is a discrete data that can be extracted from network packets and belongs to a symbolic data set. In a symbolic data set, the distance or closeness between two data values cannot be defined or is not considered to be relevant or meaningful. In particular, the employable symbolic features can be, e.g., the source and destination IP addresses, the source and destination port numbers, the transport protocol used, the source and destination email addresses, the source and destination SIP URIs (Universal Resource Identifiers), or the HTTP (Hypertext Transfer Protocol used on the World Wide Web) URIs.

In a first aspect, the present invention relates to a method (200; 300; 400) of detecting anomalies in a communication system (100), the method comprising:

providing (202; $202_1$) a first packet flow portion (PFP1) and a second packet flow portion (PFP2);

extracting (203; 303; $203_1$) samples of a symbolic packet feature (x) associated to traffic status of the first and second packet flow portions;

computing (204; 304; $204_1$) from said extracted samples a first statistical concentration quantity ($Cq_1$) and a second statistical concentration quantity ($Cq_2$) of the symbolic feature associated with the first and second packet flow portions, respectively;

computing (205, 305; $205_1$, 401) from said concentration quantities a variation quantity ($\Delta$) representing a concentration change from the first packet flow portion to the second packet flow portion;

comparing (206; 306; 402) the variation quantity ($\Delta$) with a comparison value (Thr); and detecting (207, 307, 402) an anomaly in the system in response to said comparison.

In the detection method (200) of the present invention, said first statistical concentration quantity may be a first concentration measure of an estimated probability distribution of the extracted samples associated with the first packet flow portion; and said second statistical concentration quantity may be a second concentration measure of an estimated probability distribution of the extracted samples associated with the second packet flow portion.

In the detection method (300), the symbolic packet feature may assume values included in a set of values, and computing each of said first and second concentration quantities may include:

computing a sample number representing the number of samples associated with one of said first and second flow portions;

computing an absolute frequency value representing a number of times a value belonging to said set is achieved; and computing relative frequencies of all values belonging to the set of values;

wherein computing each of said first and second concentration quantities may include:

computing from said relative frequencies each of said first and second concentration quantities as a quadratic concentration measure;

wherein computing said quadratic concentration measure may comprise:

computing quadratic values of said relative frequencies; and computing a summation of said quadratic values.

In the detection method (300) of the present invention, the symbolic packet feature may assume values included in a set of values, and computing each of said first and second concentration measures may include:

computing a sample number representing a number of samples associated with one of said first and second flow portions;

computing an effective number representing a total number of values achieved in this set; and computing a difference quantity related to a difference between said sample number and said effective number.

In the detection method (300) of the present invention, said variation quantity may be related to a difference between the first statistical concentration quantity and the second statistical concentration quantity.

In the detection method (200; 300), said step (202) of providing said first and second packet flow portions may comprise:

defining a first time window including the first packet flow portion and an associated first sample segment of the symbolic feature;

defining a second time window including the second flow portion and an associated second sample segment of the symbolic feature;

wherein said first statistical concentration quantity ($Cq_1$) and said second statistical concentration quantity ($Cq_2$) are computed from the first and second sample segments, respectively;

wherein the first and second windows may have a same time length; or wherein the detection method may further include, after a time interval equal to a delay;

defining further first and second windows by sliding the first and second windows by said delay; and repeating the method to detect an anomaly applying the method to further first and second packet flow portions corresponding to said further first and second windows, respectively; or wherein the first sample segment (W1') may comprise an initial part of the second sample segment (W2); the second sample segment (W2) including an end part which is disjoint from the first segment;

wherein the detection method may further comprise after a time interval equal to the delay:

defining further first and second sample segments by sliding the first and second
sample segments by said delay, and repeating the method to detect an anomaly applying the method to further first and second sample segments.

In the detection method of the present invention, extracting (203) samples of a symbolic feature (x) may include:

extracting samples of a numerical feature; and converting said samples of a numerical feature into said samples of a symbolic feature;

wherein extracting samples of a numerical feature may include selecting the numerical feature among a plurality of features comprising:

packet size in bytes;

total number of packets $N_{packet}$ in a time interval of length $\Delta T$;

total number of layer 3 bytes $N_{byte}$ in a time interval of length $\Delta T$;

average packet size $N_{size}$ in a time interval of length $\Delta T$, expressed in bytes;

packet rate $R_{packet}$ in a time interval of length $\Delta T$; and byte rate $R_{byte}$ in a time interval of length $\Delta T$.

The detection method (400) of the present invention, may comprise:

extracting (203j) further samples of a further symbolic packet feature associated with the first and second packet flow portions;

computing (204j) from said further samples additional statistical concentration quantities of said further symbolic feature; and computing (205j) a further variation quantity representing another concentration change from the first packet flow portion to the second packet flow portion;

wherein computing from said concentration quantities a variation quantity ($\Delta_{tot}$) representing a concentration change from the first packet flow portion to the second packet flow portion may include:

computing a first variation quantity from said concentration quantities; and combining (401) the first variation quantity and the further variation quantity to obtain said variation quantity ($\Delta_{tot}$);

wherein comparing the variation quantity with a comparison value may further include:

comparing the further variation quantity with a further comparison value; and detecting an anomaly in the system in response to said comparison of the further variation quantity with the further comparison value.

The detection method of the present invention may further include:

extracting samples of a numeric packet feature associated with the first and second packet flow portions;

wherein detecting an anomaly in the system in response to said comparison may include:

monitoring the statistical behavior of said numeric packet feature associated with the first and second packet flow portions; or the detection method may further include:

aggregating samples of a symbolic packet feature in elementary time intervals; and applying the method to said aggregated samples; or the detection method may further comprise:

selecting the comparison value (Thr) among: a fixed value, a variable value, an adaptive value, and a value depending on historical traffic data.

In the detection method of the present invention, the detected anomaly may be due to at least one of the following causes: a failure of a communication system element and an attack.

According to another aspect, the present invention relates to an apparatus (101) for detecting anomalies in a packet switched communication system, the apparatus comprising:

a collection module (102) for storing samples of a symbolic feature (x) associated with a traffic status of a first packet flow portion (PFP1) and a second packet flow portion (PFP2);

a computing module (104) arranged so as to:

compute from said samples a first statistical concentration quantity ($Cq_1$) and a second statistical concentration quantity ($Cq_2$) of the symbolic feature associated with the first and second packet flow portions, respectively; and compute from said concentration quantities a variation quantity (A) representing a concentration change from the first packet flow portion to the second packet flow portion; and a detection module (105) arranged so as to:

compare the variation quantity (A) with a comparison value (Thr); and detect an anomaly in the system in response to said comparison;

wherein the apparatus (101) may further comprise a flow aggregation module (103) for grouping numerical packet feature values of different network flows according to selected packet parameters.

In another respect, the present invention relates to a packet switched communication system (100) comprising:

an extractor module (106) for extracting samples of a symbolic packet feature (x) associated to a traffic status of a first packet flow portion (PFP1) and a second packet flow portion (PFP2); and an apparatus for detecting anomalies (101) connected to said extractor module and arranged in accordance with at least the apparatus for detecting anomalies in a packet switched communication system as described above.

In still another aspect, the present invention relates to a computer program product comprising program codes suitable to perform the detection method of detecting anomalies in a communication system as set forth above.

BRIEF DESCRIPTION OF THE DRAWINGS

The characteristics and the advantages of the present invention will be better understood from the following detailed description of embodiments thereof, which is given by way of illustrative and non-limiting example with reference to the annexed drawings, in which.

DETAILED DESCRIPTION

Hereinafter, a communication system and several embodiments of a statistical anomaly detection method will be described. In particular, the anomalous traffic to be detected can be due to (D)DoS attacks, SPAM and/or SPIT attacks, scanning attacks, as well as malicious software attacks. It should be noticed that the teachings of the present invention can also be applied to detect anomalous traffic due to failures in hardware apparatuses or in software modules operating in the communication system.

Figure 1:
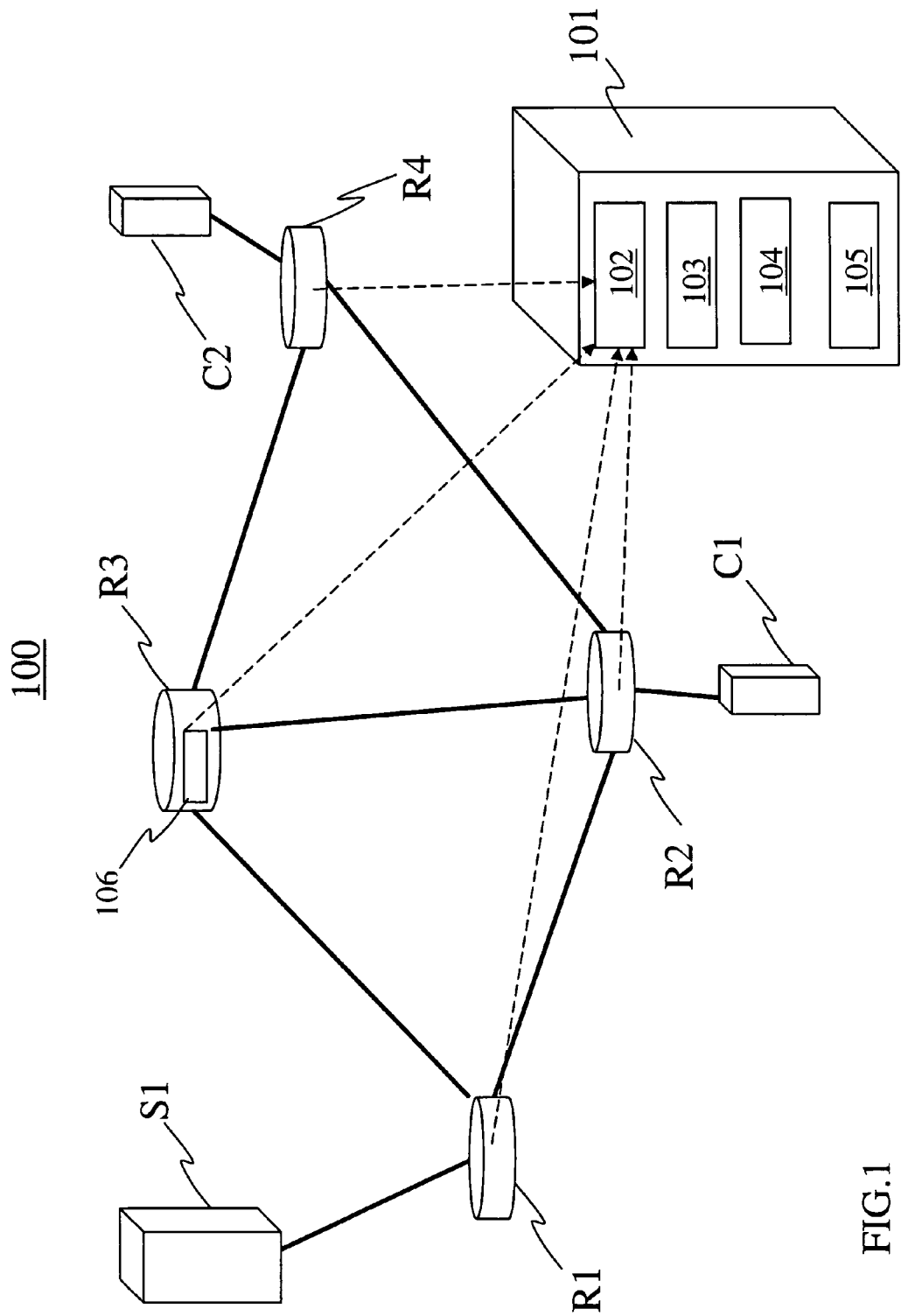
FIG. 1 schematically shows an example of a packet switched communication system comprising a detection apparatus, in accordance with the invention.

FIG. 1 sows schematically an example of a communication system 100 in which a method for detecting anomalous traffic can be implemented. The communication system 100 is a packet switched network and, for example, is a conventional Internet type network employing the IP protocol. Particularly, communication system 100 can be a SIP (Session Initiation Protocol) network for transmitting SIP signaling packets such as, according to an example, packets relating to VoIP (Voice over Internet Protocol) traffic. The communication system 100 comprises a first end system S1 (e.g., a server apparatus), a second end system C1 and a third end-system C2 which are client apparatuses. Moreover, the exemplary communication system 100 is provided with a first router R1, a second router R2, a third router R3, and a fourth router R4, each of them suitable to extract the destination of a received packet, select the best path to that destination, and forward packets to the next device along this path. Routers R1-R4 and end systems S1, C1, and C2 are connected by channels of the guided type (such as fiber optic cables, coaxial cables, or other guided transmission means) or are connectable by radio signals. The teachings of the invention are applicable to a communication system having a different number of end systems and routers. The other apparatuses normally employed in a packet switched network and, particularly, the Internet, such as modems, switches, hubs, bridges, gateways, repeaters, and multiplexers, are not shown as they are evident to the skilled person.

The particular communication system 100 illustrated in FIG. 1 includes a detection apparatus 101, such as a processor and, particularly, a host computer, which is suitable to implement the anomaly detection method to be described hereinafter. According to an example, the detection apparatus 101 comprises a central processing unit, a work memory, a mass memory (such as a hard disk), user interfaces, as well as input and output ports allowing a communication with other devices (particularly, routers R1-R4) of the communication system 100. All these components are not shown in FIG. 1. As indicated in FIG. 1, the detection apparatus 101 comprises: a data collection module 102, as an example connected with at least one of the routers R1-R4, an optional flow aggregation module 103, a statistical analysis module 104, and an alarm generation module 105. Examples of functions performed by the modules 102-105 will be described in greater detail later. Modules 102-105 can be hardware and/or software components and the detection apparatus can be located remotely from each of the routers R1-R4 or can be located by one of such routers, as an example, integrated in one of the routers R1-R4. According to another embodiment, the functions performed by modules 102-105 can be distributed among different suitable devices belonging to the communication system 100 or connected to such a system.

As known, the Open Systems Interconnection Basic Reference Model (OSI Reference Model or OSI Model for short) is a layered, abstract description for communications and computer network protocol design. It is also called the OSI seven layer model since it defines the following layers: application (7), presentation (6), session (5), transport (4), network (3), data link (2), and physical (1).

Layers 3 and 4 (the network and transport layers, respectively) include the following information of an IP packet: source IP address, TCP/UDP (Transmission Control Protocol/User Datagram Protocol) source port number, destination IP address, TCP/UDP destination port number, and transport protocol used (e.g., TCP or UDP). A series of packets having in common the above listed information is defined as a (network) "flow".

Example of an Anomaly Detection Method

Figure 2:
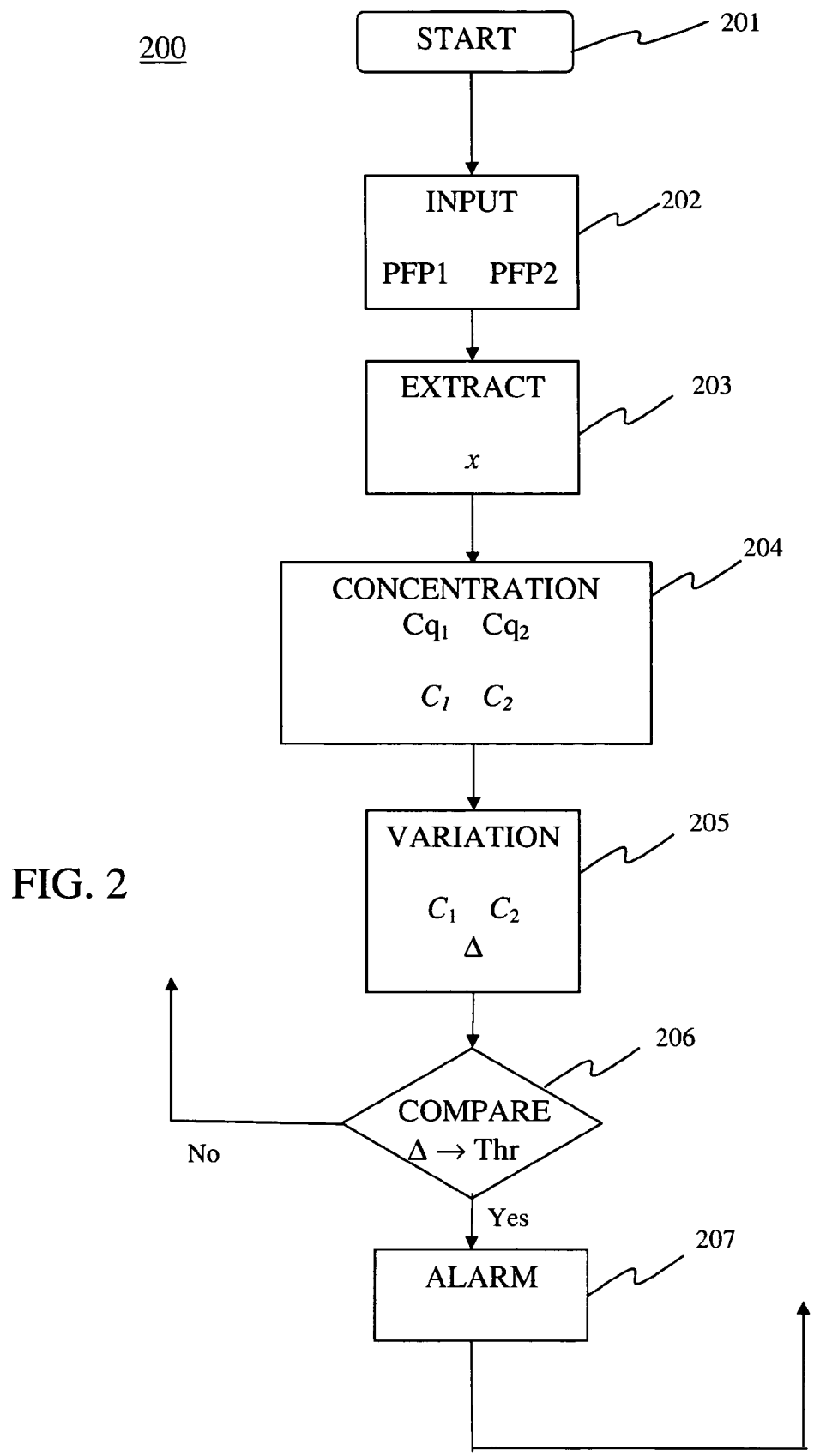
FIG. 2 illustrates by a flow chart an example of a method for detecting traffic anomalies in accordance with the invention.

FIG. 2 shows by means of a flow chart an example of a method 200 employable for the detection of anomalies on the communication system 100, in accordance with the invention. As an example, this method can be implemented by the detection apparatus 101. The method 200 initially comprises a symbolic start step 201 (START) and an input step 202 (INPUT) wherein a first packet flow portion PFP1 and a second packet flow portion PFP2 are taken from the communication system 100, separated from each other, stored, and then provided as input to the subsequent steps of the method described. The first (PFP1) and the second (PFP2) packet flow portions are possibly defined (i.e. included) in elementary time intervals of length/duration $\Delta T$. According to a first embodiment, the two flow portions PFP1 and PFP2 belong to the same network flow, as defined above.

Subsequently, in a extracting step 203 (EXTRACT), samples $(x_i)_1$ of a symbolic packet feature x associated with the first flow portion PFP1 are extracted. Samples $(x_i)_2$ of the symbolic feature x of the second packet flow portion PFP2 are also extracted. A symbolic packet feature is a discrete data that can be extracted from network packets and belongs to a symbolic data set. In a symbolic data set, the distance or closeness between two data values cannot be defined or is not considered to be relevant or meaningful. Symbolic data are specified only by discrete values and not by the metric between the values. In particular, even if the data are expressed in terms of rational or integer numbers, but the underlying Euclidean metric is considered to be irrelevant, they can be treated as symbolic data.

In particular, the employable symbolic features can be, e.g., the source and destination IP addresses, the source and destination port numbers, the transport protocol used, the source and destination email addresses, the source and destination SIP URIs or the HTTP URIs.

According to a particular embodiment, the symbolic packet feature under consideration has a two-dimensional nature, i.e., its discrete values can be indexed by two indices. In particular, a symbolic packet feature can be a two-dimensional vector consisting of two discrete coordinates. For example, the symbolic packet feature may be a pair of source and destination IP addresses, port numbers, email addresses, or SIP URIs, respectively.

In accordance with another particular embodiment, the samples of the symbolic feature x can be obtained by quantizing the samples of a "numerical packet feature" into a set of discrete values (e.g., smaller than the set of the numerical features) and are then treated as symbolic features. A numerical packet feature is any quantity extracted from network packets that can be expressed as numerical data by a real, rational, or integer number. According to this definition, it is meaningful to measure the distance or closeness between numerical feature values by the Euclidean metric. Particularly, but not necessarily, the packet numerical feature may relate to and provide an indication about the traffic volume, i.e., the data amount transported by a packet or a packet flow portion. The definitions of some specific numerical packet features which can be extracted from packets are the following:

"size in bytes" of an IP packet is the total number of layer 3 bytes in a packet;

"total number of packets" ($N_{packet}$) and "total number of layer 3 bytes" ($N_{byte}$) in a considered elementary time interval of length $\Delta T$; these two features are statistics (i.e., numerical data) regarding a flow;

"average packet size" in an interval of length $\Delta T$, in bytes, is computed as $N_{size}=N_{byte}/N_{packet}$, provided that $N_{packet}>0$;

"packet rate" $R_{packet}=N_{packet}/\Delta T$ is the number of packets per second;

"byte rate" $R_{byte}=N_{byte}/\Delta T$ is the number of bytes per second.

The average packet size can also be expressed as $N_{size}=R_{byte}/R_{packet}$. The reciprocal of $R_{packet}$ is the average inter-arrival time between two successive packets in a flow.

It is observed that the length $\Delta T$ essentially specifies the time resolution with which the traffic is monitored and analyzed and can be static or dynamic. The starting and ending times of the first and the last packet in a flow, respectively, as well as the total number of monitored flows can also be extracted in step 203. The basic numerical features described above, which are based on the information contained in layers 3 and 4 of packet headers are already available in commercial products used in IP networks such as routers and switches (e.g., the well-known Netflow data).

According to another embodiment, to reduce the number of samples of the symbolic packet features, the values of the symbolic packet feature can be grouped or hashed into a smaller set of values. For example, only some bits of a 32-bit IP address can be chosen. More generally, only some linear functions of bits of a 32-bit IP address can be chosen. As known to the skilled person, a (conventional) hash function is a reproducible method of turning original data, belonging to a symbolic data set, into hashed data belonging to a reduced symbolic data set, which contains a reduced number of discrete values. The hashed data is also called a digital "fingerprint" or digest of the original data. According to an example of the invention, conventional hash functions can be used. Alternatively, cryptographic hash functions can be used even if cryptographic properties are not required by the described example of the detection method.

Furthermore, it is noticed that the extracting step 203 can be performed by an hardware and/or software extractor module 106 included in each or only in some of the routers R1-R4 or in other network nodes that are arranged to extract and transmit the extracted symbolic or numerical features to the data collection module 102 of the detection apparatus 101 (FIG. 1).

In a computing step 204 (CONCENTRATION), a first statistical concentration quantity or measure $Cq_1$ of the symbolic feature x associated with the first packet portion PFP1 is computed on the basis of the corresponding symbolic feature samples $(x_i)_1$. Moreover, a second statistical concentration quantity or measure $Cq_2$ of the symbolic feature x associated with the second packet portion PFP2 is computed on the basis of the corresponding symbolic feature samples $(x_i)_2$. The first and second concentration quantities are associated to and describe the traffic status of the corresponding first and second packet flow portions.

A statistical concentration quantity of a set of data is a measure of how the observed symbolic values are concentrated in a given symbolic data set. Particularly, a statistical concentration quantity is a real number that achieves its maximum value if all the data values are identical, and generally decreases as the data values become dispersed among a larger subset of values. According to a particular embodiment, the first statistical concentration quantity $Cq_1$ and the second statistical concentration quantity $Cq_2$ are a first concentration measure $C_1$ of the sample probability distribution of the symbolic data feature and a second concentration measure $C_2$ of the sample probability distribution of the symbolic data feature, respectively. The computing 204 of the first and second statistical concentration quantities can be performed, according to the example, by the statistical analysis module 104. Several methods to compute the statistical concentration quantity will be described with reference to further embodiments of the example of FIG. 2.

In a further computing step 205 (VARIATION), a variation quantity $\Delta$ is computed from the first statistical concentration quantity $Cq_1$ and the second statistical concentration quantity $Cq_2$. The variation quantity $\Delta$ measures a statistical variation or change between the first statistical concentration quantity $Cq_1$ associated with the first packet flow portion PFP1 and the second statistical concentration quantity $Cq_2$ associated with the second packet flow portion PFP2. Preferably, the expected value of the variation quantity $\Delta$ should be relatively small if the first packet flow portion PFP1 and the second packet flow portion PFP2 are both drawn from a same probability distribution.

Particularly, the variation quantity $\Delta$ can be related to a difference between the first statistical concentration quantity $Cq_1$ and the second statistical concentration quantity $Cq_2$. Preferably, the variation quantity $\Delta$ is obtained from said first $C_1$ and second $C_2$ concentration measures of the probability distribution. The computation of the variation quantity $\Delta$ can also be carried out by the statistical analysis module 104.

The variation quantity $\Delta$ is compared, in a comparison step 206 (COMPARE), with a comparison value, such as a threshold Thr. According to said comparison step 206, if the threshold value Thr is exceeded, then an anomaly is detected (branch Yes) and an alarm signal ALARM is generated in an alarm issuing step 207. If the threshold value Thr is not exceeded, then an anomaly is not detected (branch No) and an alarm signal ALARM is not generated. Particularly, the comparison and the alarm generation step 207 can be performed by the above mentioned alarm generation module 105. The threshold can be static or dynamic and can be determined on the basis of historical data. In particular, a dynamic threshold can change adaptively.

Following a positive (Yes) or negative (No) anomaly detection, the detection method 200 can be repeated in connection with further packet flow portions. Particularly, the further packet flow portions can lie in time intervals whose end points are delayed with respect to the ones in which the first (PFP1) and second (PFP2) packet flow portions were included. Even more particularly, the further packet flow portions can lie in time intervals whose both start and end points are delayed with respect to the ones in which the first (PFP1) and second (PFP2) packet flow portions were included.

It should be noticed that for each monitored flow portion, not only a single packet numerical feature but also a plurality of numerical packet features can be extracted and stored and subsequently converted into symbolic features, as explained above. For example, the following features can be considered: $R_{packet}$, $R_{byte}$, and $N_{size}$. It is observed that any two of the numerical features $R_{packet}$, $R_{byte}$, and $N_{size}$ are mutually independent.

Any such feature can be used to detect a respective anomaly. In particular, the average packet size $N_{size}$ is preferable for detecting anomalous traffic comprising repeated transmission of essentially the same or similar packets (e.g., packets with the same payload), because in this case $N_{size}$ changes its probability distribution over time with respect to normal traffic, e.g., its concentration measure over time may increase. For example, if a message flooding (D)DoS attack is in progress on a SIP network, then it may be likely that a particular type of SIP messages/packets (e.g., INVITE, RE-INVITE, BYE, or REGISTER) is (much) more frequent than the others.

Moreover, in addition to the average packet size $N_{size}$ also the packet rate $R_{packet}$ is monitored and involved into the anomaly detection method 200. For most anomalous traffic, such as the request or message flooding and reflection DDoS traffic, the traffic volume is increased and this is reflected in an increased value of $R_{packet}$. An increased $R_{packet}$ can also be caused by normal traffic such as flash crowds. Also, in case of DDoS attacks, the traffic volume is high near the target, but may be low near the distributed sources of the attack. Therefore, it is preferable to employ both $N_{size}$ and $R_{packet}$ for statistical anomaly detection.

The features $N_{size}$ and $R_{packet}$ can be traced in time at the chosen network node (i.e. a router) or a set of nodes, for each individual flow or for certain selected flows, e.g., according to the packet rate. Alternatively, in accordance with a particular example, the numerical feature values for individual flows can be aggregated in groups according to selected packet parameters such as the source or destination IP addresses or the source or destination port numbers. For example, the flows can be grouped for the same source IP address or the same destination IP address. In the former case, the flow statistics correspond to the outbound traffic from a particular network node, and in the latter, they correspond to the inbound traffic to a particular network node. The number of simultaneously monitored flows with the same IP address as the source/destination address indicates the activity of a node with that IP address as the source/destination node in the observed time interval, respectively. The detection method 200 can be applied to any group of aggregated packet numerical features values converted into symbolic features. The features grouping step can be performed by the flow aggregation module 103 (FIG. 1).

Alternatively, the features for all the flows monitored can be grouped together, in particular, by distinguishing the direction of flows, regardless of the particular source/destination IP addresses. This type of grouping is interesting for a high level analysis which does not pay attention to particular nodes or users, but rather to the network traffic as a whole. Instead of the IP addresses, the features grouping can be made according to the port numbers, which are indicative of the applications of the packets transmitted.

With reference to the selection of the basic symbolic features, it should be noticed that other symbolic packet features of interest include the source and destination IP addresses and the source and destination port numbers. They are especially interesting for detecting DDoS attacks using randomly spoofed source IP addresses or port scanning attacks using randomly generated destination port numbers. They are also useful for detecting other attacks such as massive malicious software attacks targeting random destination IP addresses. In particular, two-dimensional symbolic data features and the average conditional concentration measure of destination IP addresses can be considered in order to detect SPAM or SPIT attacks or massive malicious software attacks and the average conditional concentration measure of source IP addresses can be considered in order to detect DDoS attacks.

With reference to the selection of other symbolic features, it is also possible to extract and use information contained in other layers such as the application layer (layer 7), in addition to the basic symbolic packet features described above. For example, for SIP packets, the type of packet being transmitted or a source or destination SIP URI can be extracted. Then, this information along with the basic flow features related to layers 3 and 4 can be used either directly or for aggregating the packet data $R_{packet}$, $R_{byte}$, and $N_{size}$. For example, one may use the application layer information directly, for detecting DDoS attacks using randomly spoofed source email addresses or SIP URIs and for detecting SPAM or SPIT attacks using random destination email addresses or SIP URIs, respectively. In particular, one may consider two-dimensional symbolic data features and the average conditional concentration measure of destination email addresses or SIP URIs in order to detect SPAM or SPIT attacks, respectively, or the average conditional concentration measure of source email addresses or SIP URIs in order to detect DDoS attacks.

First Embodiment

A first embodiment 300 of the detection method 200, is described herein below with reference to FIG. 3. Symbolic feature x is one of the above identified symbolic features extracted from flows of network packets, at a chosen network node, in (elementary) short time intervals of length $\Delta T$, in some time units (e.g., $\Delta T$ is comprised 1 s–5 min), where $\Delta T$ can vary in time. In particular, as indicated above x can be the packet rate $R_{packet}$, the average packet size $N_{size}$, or the byte rate $R_{byte}$ suitably grouped, quantized, or hashed into a smaller set of symbolic values. For $R_{packet}$ and $R_{byte}$, the zero values are allowed, if there are no packets with chosen features in the considered short time interval, whereas $N_{size}$ has to be positive and is not defined if in the considered short time interval there are no packets with chosen features. If the features relate to individual network packets, then $\Delta T$ corresponds to the packet inter-arrival time. The corresponding sequence of samples of the feature x taken in time is denoted as $(x_i)_{i=1}^{\infty}$.

As regards step 202 of FIG. 2, wherein the two packet portions PFP1 and PFP2 are defined, method 200 is based on sliding windows, i.e. time intervals which are sliding in time. Particularly, a time interval of a length T (greater than $\Delta T$) that is sliding in time, is defined. The time interval of length T, starting from an initial position, each time advancing of $\tau$ units of time (delay), where is a given parameter. If $\Delta T$ is static, i.e., fixed, then T and $\tau$ can be defined as fixed integer multiples of $\Delta T$. If $\Delta T$ is dynamic, i.e., variable in time, then it is assumed that each sliding window contains an integer number of short time intervals and approximately has the same length T.

Figure 4:
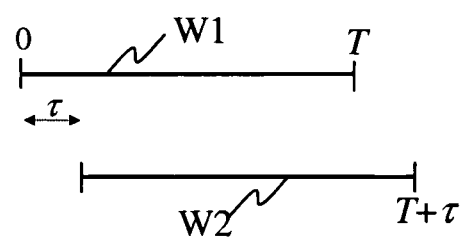
FIG. 4 shows two exemplary time windows defined in accordance with said first embodiment.

Accordingly, two successive windows of (approximately) the same length T are shifted $\tau$ units of time from each other and hence overlap over T–$\tau$ units of time. In this embodiment, at any given time, the packet flow portion PFP1 then corresponds to a sliding window at this time and the packet flow portion PFP2 corresponds to the next sliding window, delayed by $\tau$. It should be noted that samples of the numerical features x can be taken irregularly in time, i.e., in time intervals of possibly variable length $\Delta T$. In this case, the number of samples per sliding window may vary in time, and so do the numbers of overlapping and non-overlapping samples in two successive sliding windows. FIG. 4 schematically illustrates two time intervals corresponding to two exemplary sliding windows: the first window W1 extends from time 0 to T and the second window W2 extends from time $\tau$ to T+$\tau$.

Alternatively, when the samples of x are taken irregularly in time, sliding windows containing the same number of samples and mutually shifted with respect to each other by a fixed number of samples instead of a fixed number of units of time can be chosen. In this case, the windows are defined in terms of samples instead of the corresponding time, which may be variable.

Figure 3:
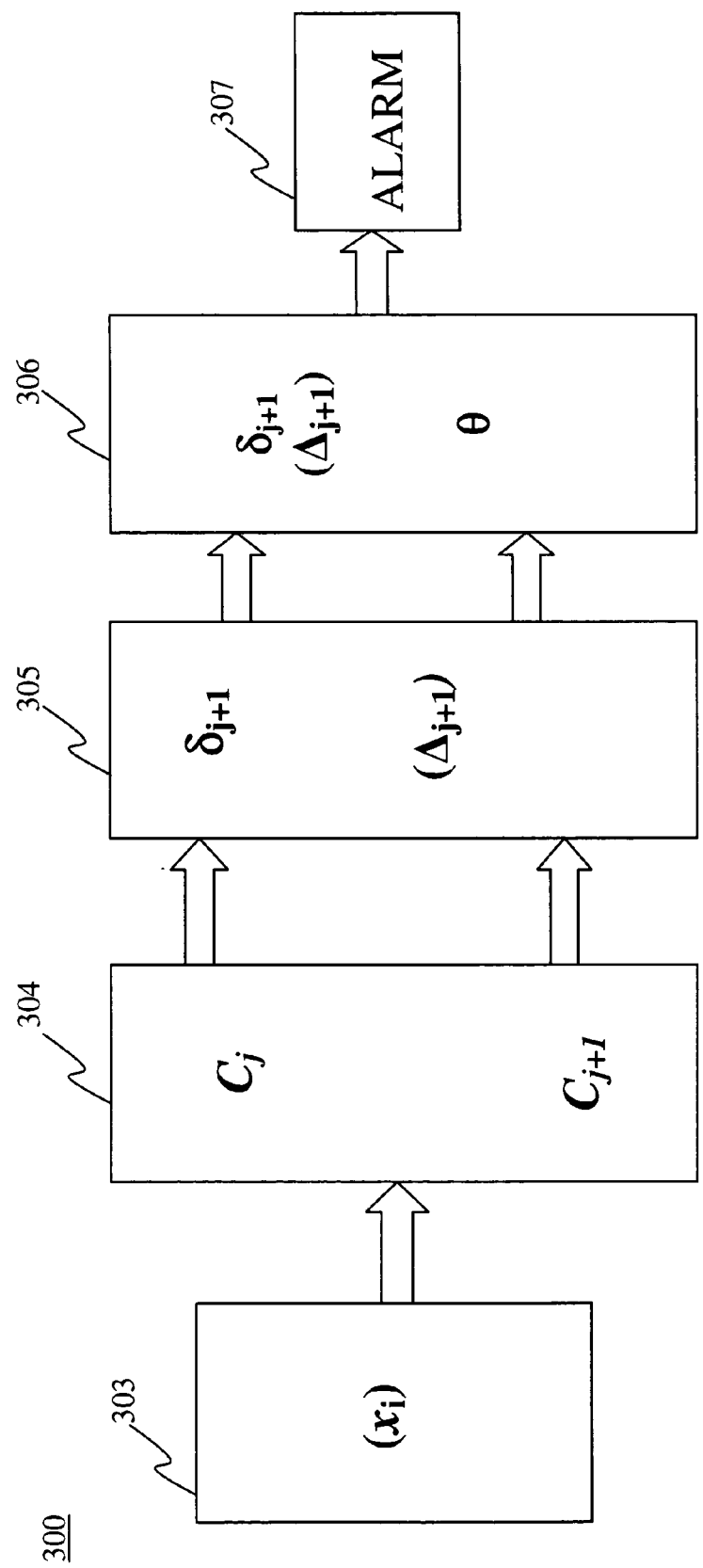
FIG. 3 shows a first embodiment of said example of the method for detecting traffic anomalies.

As shown by means of functional blocks in FIG. 3, in a storing step 303, a first segment of symbolic feature samples $$(x_i)_{i=m_j-n_j+1}^{m_j} \tag{1}$$

corresponding to a $j^{th}$ sliding window of length T (e.g., window W1 of FIG. 4), such as the one associated with the first packet flow portion PFP1 of step 202 in FIG. 2 is stored. The indexes in expression (1) represent the following:
  i indicates a sample number,
  j indicates a window number,
  $m_j$ indicates the end point of a window,
  $n_j$ indicates the number of samples in a window.

The number of samples $n_j$ in the window/segment is in general variable.

The number of achievable discrete values of the feature x is denoted by m and the set of all m achievable values by is denoted by $A=\{a_k: 1 \le k \le m\}$.

In a given $j^{th}$ sliding window, $F_{k,j}$ denotes the number of times a value $a_k$ is achieved, i.e., the absolute frequency of a value $a_k$. In a step 304 of FIG. 3, the following quantity is computed in relation to any value $a_k$:

$$f_{k,j} = F_{k,j}/n_j \tag{2}$$

wherein $f_{k,j}$ is the relative number of times a value $a_k$ is achieved, i.e., the relative frequency of a value $a_k$. In general, a relative frequency of a particular discrete value in a finite sample of values is defined as the number of occurrences of this value in the sample divided by the total number of values in the sample. Accordingly, the estimated or sample probability distribution is $$P_j = (f_{k,j})_{k=1}^{m}. \tag{3}$$

Therefore, the estimated or sample probability distribution is an ordered set of relative frequencies.

According to the first embodiment, the statistical concentration quantity considered is a concentration measure associated with the estimated probability distribution $P_j = (f_{k,j})_{k=1}^{m}$. Then, a first concentration measure $C_j$ is computed as a quadratic concentration measure for the computed relative frequencies:

$$C_j = \sum_{k=1}^{m} f_{k,j}^2. \tag{4}$$

The summation of formula (4) is computed for m addends.

According to another embodiment of step 304, the concentration measure $C_j$ is computed by applying the following formula:

$$C_j = \sum_{k=1}^{m_j^{eff}} f_{k,j}^2, \tag{5}$$

where $m_j^{eff}$, which is smaller than or equal to m, denotes the total number of values $a_k$ achieved in the $j^{th}$ sliding window, i.e., the total number of non-zero relative frequencies. The summation of formula (5) is computed for $m_j^{eff}$ addends. Expression (5) represents a quadratic concentration measure for the computed non-zero relative frequencies. If the number of samples $n_j$ is not sufficiently large to cover the whole range of m values (e.g., if $n_j < m$ or $n_j \ll m$), then $m_j^{eff} < m$.

Alternatively, the concentration can be computed by the following expression:

$$C_j = m \sum_{k=1}^{m} f_{k,j}^2 - 1, \quad (6)$$

which may be numerically more convenient than expression (4) if m is large and the involved relative frequencies are very small. It shall be noticed that a statistical dispersion measure corresponding to the quadratic concentration measure (4) is a quadratic entropy defined as:

$$\sum_{k=1}^{m} f_{k,j}(1 - f_{k,j}) = 1 - \sum_{k=1}^{m} f_{k,j}^2 = 1 - C_j. \quad (7)$$

It follows that $1/m \le C_j \le 1$. The maximum value $C_j=1$ is achieved if and only if the probability distribution is maximally concentrated, i.e., if there exists exactly one relative frequency equal to 1 and all the others are equal to 0. The minimum value $C_j=1/m$ is achieved if and only if the probability distribution is uniform, i.e., $f_{k,j}=1/m$ for all $1 \le k \le m$. In particular, the quadratic concentration measure defined by any of the expressions (4)-(6) is particularly interesting if the number of samples $n_j$ is relatively large with respect to m, e.g., if $n_j \ge m$.

Alternatively to the expressions (4), (5) and (6), the following formula can be used:

$$C_j = \sum_{k=1}^{\tilde{m}} \tilde{f}_{k,j}^2, \quad (8)$$

where $\tilde{m} \le m$ and $$\tilde{f}_{k,j} = f'_{k,j} \bigg/ \sum_{k=1}^{\tilde{m}} f'_{j,k} \quad (9)$$

are the normalized $\tilde{m}$ highest relative frequencies, which sum up to 1. These frequencies correspond to a probability distribution $P'_j=(f'_{k,j})_{m=1}^{m}$, which represents an ordered estimated probability distribution with the relative frequencies indexed in order of decreasing values, i.e., $f'_{1,j} \ge f'_{2,j} \ge \ldots \ge f'_{m-1,j} \ge f'_{m,j}$. The summation of formula (8) is computed for $\tilde{m}$ addends. Expression (8) defines a quadratic concentration measure for the number $\tilde{m}$ of highest relative frequencies.

It follows that $1/\tilde{m} \le C_j \le 1$. With reference to expression (8), the maximum value $C_j=1$ is achieved if and only if the probability distribution is maximally concentrated, i.e., if there exists exactly one relative frequency equal to 1 and all the others are equal to 0. The minimum value $C_j=1/\tilde{m}$ is achieved if and only if the probability distribution of the $\tilde{m}$ highest relative frequencies is uniform, i.e., $\tilde{f}_{k,j}=1/\tilde{m}$ for all $1 \le k \le \tilde{m}$. This concentration measure is interesting if the number of samples $n_j$ is relatively small with respect to m, i.e., if $n_j < m$. The number $\tilde{m}$ should be determined so that $m_j^{\text{eff}} > \tilde{m}$ is satisfied with a high probability.

In accordance with an alternative embodiment, the concentration measure is computed as the number of repetitions among all $n_j$ samples:

$$C_j = n_j - m_j^{\text{eff}}. \quad (10)$$

It follows that $0 \le C_j \le n_j - 1$. The maximum value $C_j = n_j - 1$ is achieved if and only if the probability distribution is maximally concentrated, i.e., if there exists exactly one relative frequency equal to 1 and all the others are equal to 0, i.e., if $m_j^{\text{eff}}=1$. The minimum value $C_j=0$ is achieved if and only if there are no repetitions, i.e., if all the values generated are different, i.e., if $m_j^{\text{eff}}=n_j$, in which case $n_j \le m$ has to be satisfied. This concentration measure is particularly interesting if the number of samples $n_j$ is much smaller than m, i.e., if $n_j \ll m$, in which case most of relative frequencies are relatively small. Note that if the samples are generated randomly according to the uniform probability distribution and if $n_j \approx \sqrt{m}$, then the expected number of repetitions is approximately $n_j^2/2m$. More precisely, the expected number of repetitions is approximately $n_j - m(1-e^{-n_j/m})$.

With reference to the case in which the symbolic packet feature under consideration has a two-dimensional nature and so can be indexed by two indexes, the concentration measure can be based on a conditional probability, i.e., the probability of a value of one of the two indexes given a value of the other index. Particularly, the concentration measure can be computed as an average conditional quadratic concentration measure in accordance with the following expression:

$$C_j = \sum_{k_1} f_{k_1,j} \sum_{k_2} \left( \frac{f_{k_1,k_2,j}}{f_{k_1,j}} \right)^2 = \sum_{k_1,k_2} \frac{f_{k_1,k_2,j}^2}{f_{k_1,j}}. \quad (11)$$

With reference to the quantities indicated in expression (11), in a given $j^{th}$ window, $F_{k_1,k_2,j}$ denotes the number of times a value $a_{k_1,k_2}$ is achieved, i.e., the absolute frequency of a value $a_{k_1,k_2}$ and $f_{k_1,k_2}{}^j=F_{k_1,k_2,j}/n_j$ denotes the relative number of times, i.e., the relative frequency of a value $a_{k_1,k_2}$. The expressions $f_{k_1}{}^{,j}=\Sigma_{k_2} f_{k_1,k_2}{}^j$ and $f_{k_2}{}^{,j}=\Sigma_{k_1} f_{k_1,k_2}{}^j$ denote the relative frequencies of the discrete values with indices $k_1$ and $k_2$ in the $j^{th}$ window, respectively. Then, expression (11) defines the average conditional quadratic concentration measure conditioned on the index $k_1$.

Furthermore, the average conditional quadratic concentration measure to conditioned on the index $k_2$ is computed in accordance with the following expression, which is analogous to formula (11):

$$C_j = \sum_{k_2} f_{k_2,j} \sum_{k_1} \left( \frac{f_{k_1,k_2,j}}{f_{k_2,j}} \right)^2 = \sum_{k_1,k_2} \frac{f_{k_1,k_2,j}^2}{f_{k_2,j}}. \quad (12)$$

It should be noticed that in expressions (11) and (12), $f_{k_1,k_2}{}^j/f_{k_1}{}^{,j}$ and $f_{k_1,k_2}{}^j/f_{k_2}{}^{,j}$ represent the conditional relative frequencies of the discrete values conditioned on $k_1$ and $k_2$, respectively. In (11) and (12) it is assumed that the sums extend only over the values of $k_1$ and $k_2$ such that the involved relative frequencies $f_{k_1,j}$ and $f_{k_2,j}$ are different from zero, respectively.

With reference again to a two-dimensional symbolic variable, alternatively to expressions (11) and (12), the following "unconditional" concentration measures can also be computed:

$$C_j = \sum_{k_1,k_2} f_{k_1,k_2,j}^2 \quad (13)$$

-continued $$C_j = \sum_{k_1} f_{k_1,j}^2 \qquad (14)$$

$$C_j = \sum_{k_2} f_{k_2,j}^2. \qquad (15)$$

Formula (13) defines an unconditional concentration measure pertaining to both the indices $k_1$ and $k_2$, formula (14) defines an unconditional concentration measure pertaining to the first index $k_1$, and formula (15) defines an unconditional concentration pertaining to the second index $k_2$.

Analogously to the first segment of expression (1), a second segment of symbolic features samples $$(x_i)_{i=m_{j+1}-n_{j+1}+1}^{m_{j+1}} \qquad (16)$$

corresponding to a $(j+1)^{th}$ sliding window of length T (e.g., second window W2 of FIG. 4), such as the one associated with the second packet flow portion PFP2 of step 202 in FIG. 2, is stored. In a computing step 304, a second concentration measure $C_{j+1}$ associated with the second sliding window of the second packet flow portion PFP2 is computed applying one of the expressions described above with reference to the first concentration measure $C_j$.

In a computing step 305, the variation quantity Δ is computed from said first $C_j$ and second $C_{j+1}$ concentration measures. According to an example, the variation quantity is an absolute squared difference $\Delta_{j+}$ of concentration measures for the two successive segments (1) and (16) and can be computed by the following formula:

$$\Delta_{j+1} = (C_{j+1} - C_j)^2 \qquad (17)$$

Alternatively, the variation quantity is computed as the relative squared difference of the concentration measures for two successive segments by one of the following expressions:

$$\delta_{j+1} = \frac{(C_{j+1} - C_j)^2}{C_{j+1} C_j} \qquad (18)$$

$$\delta_{j+1} = \frac{(C_{j+1} - C_j)^2}{(1 - C_{j+1})(1 - C_j)} \qquad (19)$$

$$\delta_{j+1} = \frac{(C_{j+1} - C_j)^2}{\sqrt{C_{j+1} C_j (1 - C_{j+1})(1 - C_j)}}. \qquad (20)$$

In a comparison step 306, the difference $\Delta_{j+1}$ or $\delta_{j+1}$ is then compared with a fixed or dynamic threshold $\theta_{j+1}$, where generally the threshold increases as T/τ decreases. If the threshold is exceeded once or repeatedly a specified number of times in successive computations, where this number may increase as the ratio T/τ decreases, then an alarm ALARM for anomalous traffic is generated in an alarm step 307.

Figure 5:
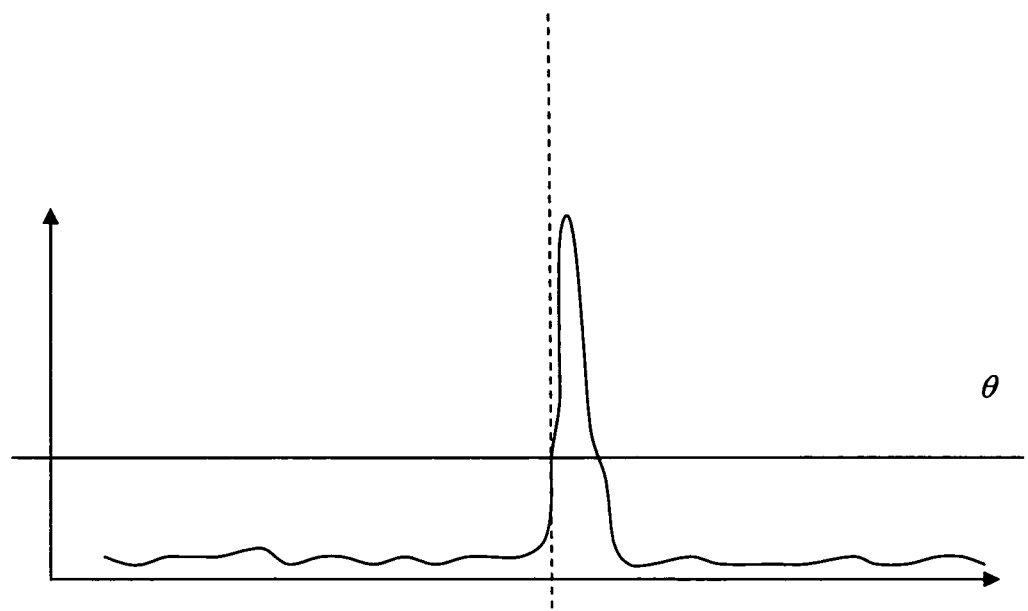
FIG. 5 shows the detection of anomalous traffic obtained with a simulation of said first embodiment.

FIG. 5 illustrates an example of a resulting curve of (relative) squared differences of concentration measures, obtained with time resolution τ. It should be noticed that an alert is issued at the rising edge of this curve.

With reference to the threshold definition and according to an example, the threshold θ may be a fixed value. In accordance with another example and to account for changes of concentration measure in normal traffic, the threshold θ could be determined possibly from historical data for normal traffic, at a considered network node, in order to keep the false positive rate reasonably low. In particular, the threshold θ may depend on the time of the day. The concrete relative squared difference to be used among the ones above defined can be chosen so as to minimize its variation on historical data for the normal traffic. Particularly, the threshold can be chosen irrespectively of statistical model estimating the traffic behavior.

Given an appropriate value of the threshold θ, it is then expected that the probability that the threshold is exceeded, i.e., the false-positive rate is low for normal traffic, whereas at times where there is a change from normal traffic to anomalous traffic, it is expected that the threshold is not exceeded with a low probability, i.e., with a low false-negative rate.

It is noticed that the method 300 is robust as the changes are related to concentration measures of probability distributions, and not to probability distributions, which may change rapidly for the normal traffic conditions. The concentration measure of formula (8) is more robust than the one of formulas (4) and (5), because it relates to a subset of the highest relative frequencies only. The concentration measure of formula (10) is more robust than the one of formulas (4) and (5) or (8), because it depends only on the total number of values achieved and, as such, is less sensitive to the probability distribution itself.

However, unlike the concentration measures (4), (5) and (8), the concentration measure according to expression (10) is sensitive to changes in the number of samples $n_j$ from one sliding window to another. Accordingly, the sliding windows for the concentration measure (10) can be defined in terms of a fixed number of samples instead of a fixed time duration and mutually shifted with respect to each other by a fixed number of samples instead of a fixed number of units of time. This also simplifies the computation of the concentration measures (4), (5) and (8). Alternatively, if the number of samples is expected to vary considerably from one window to another, one can perform a normalization of expression (10) by dividing by an appropriate normalization factor, e.g., by $n_j^2/2m$.

It should be noticed that the value of the delay or shift τ determines the resolution of the above proposed statistical anomaly detection method 300, because it takes τ units of time, or a small multiple of τ units of time, in order to detect a change from normal to anomalous traffic. Preferably, the value of T should be large enough in order to obtain relatively stable estimates of the chosen concentration measure so that for normal traffic the relative changes of the concentration measure are not too large. On the other hand, the ratio T/τ should not be too large so that the change of traffic from normal to anomalous does not require a very small threshold θ to be detected. For example, the ratio T/τ may be chosen so as to satisfy the following expression:

$$1 \leq T/\tau \leq 10. \qquad (21)$$

Second Embodiment

According to a second example of the detection method 200, the two successive windows are defined in a different way with respect to the first embodiment.

According to this second embodiment, in step 202 at time j+1, the following first and second sample segments corresponding to packet flow portions PFP1 and PFP2, respectively, are considered:

$$(x_i)_{i=m_{j+1}-n_{j+1}+1}^{m_j} \qquad (22)$$

$$(x_i)_{i=m_{j+1}-n_{j+1}+1}^{m_{j+1}}, \qquad (23)$$

where the first segment (22) is the initial part of the second segment, without the ending part $(x_i)_{i=m_j+1}^{m_{j+1}}$ or, equivalently, the last part of the preceding segment $(x_i)_{i=m_{j+1}-n_{j+1}+1}^{m_{j+1}}$, without the initial part $(x_i)_{i=m_j-n_j+1}^{m_{j+1}-n_{j+1}}$.

Figure 6:
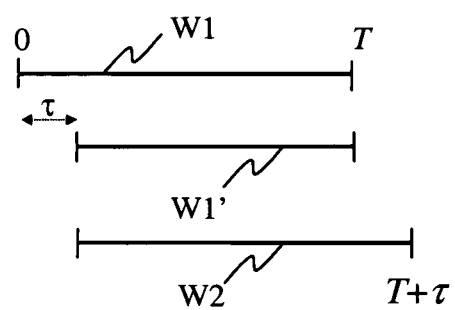
FIG. 6 illustrates two exemplary time windows defined in accordance with a second embodiment of said example of the method for detecting traffic anomalies.

FIG. 6 shows schematically two successive sliding windows W1 and W2, as in FIG. 4, with a difference that the first packet flow portion PFP1 is now associated with a shortened window W1', extending from τ to T, whereas the second packet flow portion PFP2 is associated with W2 as in FIG. 4. In this way, the past data leaving the current sliding window are thus excluded from the concentration measure comparison. In step 204, the second concentration measure $C_{j+1}$ corresponding to the segment (23) is then compared with the first concentration measure $\hat{C}_1$ corresponding to the shorter first segment (22) by using one of the expressions for the squared difference $\Delta_{j+1}$ or $\delta_{j+1}$ of concentration measures defined with reference to the first embodiment 300.

As indicated in step 206, the squared difference $\Delta_{j+1}$ or $S_{j+1}$ is then compared with a threshold. This threshold may be somewhat reduced in comparison with the threshold of the first embodiment 300, because, for normal traffic, the concentration measures for the two segments are then expected to be less mutually different.

The method of the second embodiment may be more suitable than the one of the first embodiment 300 for detecting anomalous traffic of duration shorter than the window size T. This is due to the fact that in the first embodiment, a considerable change in concentration measure, due to the beginning of anomalous traffic, would be detected not only by the ending point of the sliding window (such as the window W2 in FIG. 4), when it enters the segment of anomalous traffic, but also by the initial part of the sliding window (such as the window W2 in FIG. 4), when it leaves the segment of normal traffic and enters the segment of anomalous traffic. On the other hand, in the second embodiment, a change of concentration measure will then be detected only by the ending point of the sliding window (such as the window W2 in FIG. 6).

Third Embodiment

Figure 7:
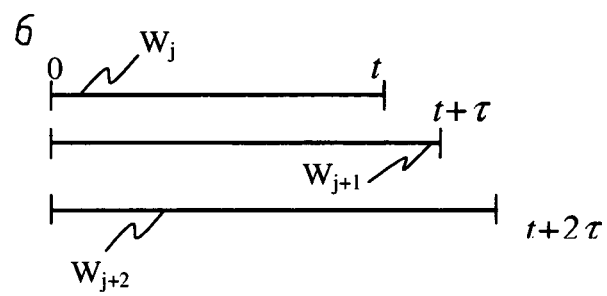
FIG. 7 illustrates exemplary time windows defined in accordance with a third embodiment of said example of the method for detecting traffic anomalies.

In a third embodiment of the detection method 200, a moving window of increasing length is defined. Such moving window extends from a chosen initial time up to the current time, and each time, the ending point of the moving window advances τ units of time, where τ determines the resolution in time for detecting the anomalous changes in traffic. FIG. 7 shows schematically three exemplary successive windows $W_j$, $W_{j+1}$, and $W_{j+2}$ drawn in accordance with this third embodiment of the detection method 200. In FIG. 7, t denotes a generic time.

At each time, the packet flow portions PFP1 and PFP2 correspond to two successive moving windows. Accordingly, for a generic window index j, the packet flow portion PFP1 is defined by the segment $$(x_i)_{i=1}^{m_j}, \qquad (24)$$

which is associated with the $j^{th}$ moving window containing $m_j$ samples, and the packet flow portion PFP2 is defined by the segment $$(x_i)_{i=1}^{m_{j+1}}, \qquad (25)$$

which is associated with the $(j+1)^{th}$ moving window containing $m_{j+1}$ samples.

According to the third embodiment, the concentration measure is based on the relative frequencies of individual discrete values which are computed by selected exponentially weighted sums so that the influence of the past data on the concentration measure decreases as the time decreases, in order to ensure the sensitivity to anomalous behavior of the current data. As an example, the third embodiment is based on a novel Exponential Weighted Moving Average (EWMA) technique applied to relative frequencies of discrete values of symbolic variables. This method is described hereinafter in greater detail and in terms of mathematical equations.

In the computing step 204, a sequence $(\vec{\lambda}_i)_{i=1}^{\infty}$ of value-indicator vectors associated with the sequence of samples $(x_i)_{i=1}^{\infty}$ are defined. A vector $\vec{\lambda}_i$, at time i, is an m-dimensional binary vector associated with the sample $x_i$ whose coordinates correspond to different discrete values, with only one coordinate equal to 1, namely, the coordinate corresponding to the discrete value assumed by the sample $x_i$, and all the remaining coordinates equal to zero. Moreover, another vector $\vec{f}_t$ is defined; this vector is an m-dimensional vector of estimated relative frequencies on the segment $(x_i)_{i=1,t}$ of t initial data samples.

In accordance with the specific EWMA technique defined, a computation of the vector of estimated relative frequencies $\vec{f}_t$ is performed by an iterative-recursive method. Particularly, the computation of $\vec{f}_t$ for every new data sample considered, for t=1,2, ..., is performed in accordance with the following expression:

$$\vec{f}_{t+1} = a\vec{\lambda}_{t+1} + (1-a)\vec{f}_t \qquad (26)$$

with the initial value $\vec{f}_1 = \vec{\lambda}_1$, where $0 < a \leq 1$. A meaning of the recursion (26) can be seen from its explicit solution:

$$\vec{f}_t = (1-\alpha)^{t-1}\vec{\lambda}_1 + \alpha\sum_{i=2}^{t}(1-\alpha)^{t-i}\vec{\lambda}_i, \qquad (27)$$

which represents an exponentially weighted average applied to the value-indicator vectors. It should be noticed that the vectorial recursion (26) is equivalent to the set of m scalar recursions, corresponding to m individual discrete values, for computing individual relative frequencies, for k=1,2, ..., m, by $$f_{k,t+1} = a\lambda_{k,t+1} + (1-a)f_{k,t}, \qquad (28)$$

with an explicit solution $$f_{k,t} = (1-\alpha)^{t-1}\lambda_{k,1} + \alpha\sum_{i=2}^{t}(1-\alpha)^{t-i}\lambda_{k,i}, \qquad (29)$$

where $\lambda_{k,i}=1$ if $x_i=a_k$ and $\lambda_{k,i}=0$ otherwise.

At time j+1, the concentration measure associated with the second segment $(x_i)_{i=1}^{m_{j+1}}$ is computed and compared with the previously computed concentration measure associated with the first segment $(x_i)_{i=1}^{m_j}$ by using a concentration measure difference as in the first embodiment.

The concentration measures can be computed by applying any of the corresponding expressions (4), (5), (8), (11), or (12) to the iteratively computed relative frequencies. It is observed that the concentration measure defined by expression (10) is excluded from the third embodiment, because it is not specifically related to relative frequencies.

More precisely, the chosen concentration measure $C_j$ is then computed for each segment $(x_i)_{i+1}^{m_j}$ by using the relative frequency vector $\vec{f}_{m_j}$, j=1,2, ..., and, at time j+1, the concentration measures $\hat{C}_{j+1}$ and $C_j$ corresponding to two successive moving windows are then compared (in step 205) by using expression (17), (18), (19), or (20) as described with reference to the first embodiment.

The value of the constant α determines the effective number of past samples influencing the current relative frequency vector and the resulting concentration measure estimates. More precisely, this number increases as the constant decreases. In particular, smaller values of α are preferred in order to obtain relatively stable relative frequency estimates. Preferably, α should be chosen in accordance with the statistical properties of the normal traffic. In general, the faster the concentration measure variations in normal traffic one may expect, the bigger the constant α one should choose.

Fourth Embodiment

Figure 8:
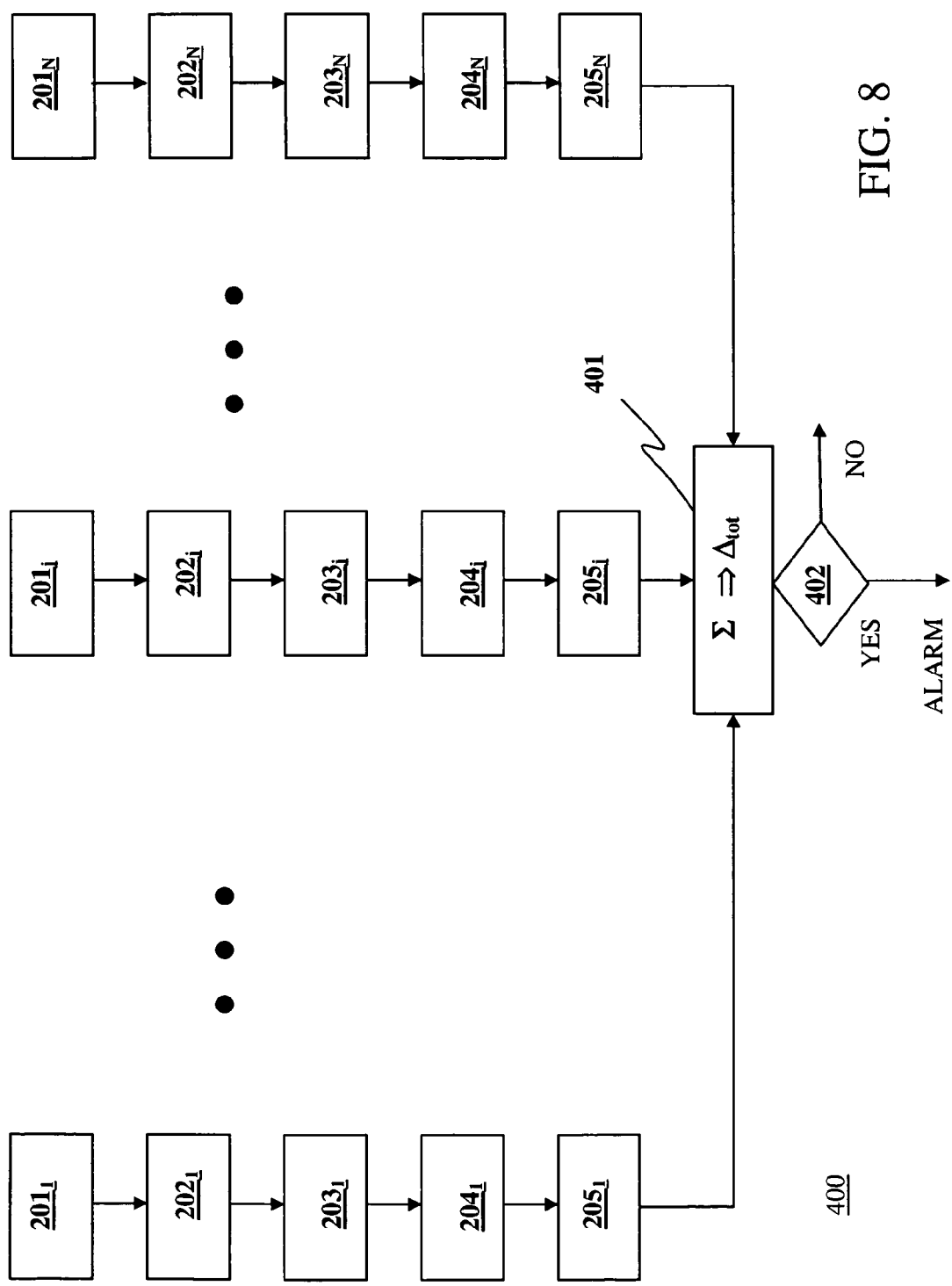
FIG. 8 illustrates by a flow chart a fourth embodiment of said example of the method for detecting traffic anomalies.

In a fourth embodiment 400 of the present invention, schematically shown in FIG. 8, a number of symbolic packet features are employed simultaneously. In accordance with this fifth embodiment 400 and under the assumption that the symbolic packet features are roughly independent, a plurality of N concentration measures associated with different symbolic packet features are computed. Particularly, steps 201-205 of the exemplary method 200 are repeated for each different symbolic packet feature, for $j=1, \ldots, N$.

Moreover, for each considered symbolic packet feature, a relative squared difference of concentration measures $C_j$ is computed, for $j=1, \ldots, N$. In a further step 401 (Σ), the relative squared differences of concentration measures $C_1, \ldots, C_N$ are combined to obtain a total variation quantity $\Delta_{tot}$. According to an example, the combination step is a summation of said relative squared differences of concentration measures $C_1, \ldots, C_N$. The total variation quantity $\Delta_{tot}$ is then compared (step 402) with a threshold value Thr in order to detect an anomalous condition which can cause the generation of an alarm signal or message ALARM (branch Yes). The comparison of the total variation quantity $\Delta_{tot}$ with the threshold value Thr could detect a normal traffic condition (branch No) and, in this case, no alarm signals or messages are generated.

It should be noticed that the combination step 401 may be performed by different types of combination algorithms. According to another particular example, prior to performing the summation, the relative squared differences of concentration measures $C_1, \ldots, C_N$ are multiplied with different weights that may be associated with individual symbolic packet features.

Moreover, different decision criteria may be employed. According to an example, a total variation quantity $\Delta_{tot}$ is not computed and comparisons of each of the relative squared differences of concentration measures $C_1, \ldots, C_N$ with a respective threshold are performed. An alarm signal is then generated if at least a specified number of said comparisons detect an anomalous traffic condition. According to another example, in addition to the variation quantity criterion, aiming at detecting sudden changes of concentration measure, one may also take into account other criteria, e.g., for message flooding (D)DoS attacks, one may require that there is also a significant change of the packet rate $R_{packet}$ or the byte rate $R_{byte}$. For $N_{size}$, apart from looking for a considerable (relative) change in concentration measure, one may also specifically require that the concentration measure increases.

In addition to symbolic packet features, also numerical packet features (as defined above) can be taken into account. In this case, the detection of anomalies in the communication system 100 can be performed by a combination of the above indicated criteria based on symbolic packet features and other criteria based on monitoring of statistical behavior of numeric packet features associated with the first and second packet flow portions. As an example, the criteria described in the pending PCT application in the name of the same applicant of the present patent application and having the following title "Method of detecting anomalies in a communication system using numerical packet features" can be employed in combination with the ones herein described. This further PCT application, which refers to a method of monitoring a statistical dispersion quantity, is herein enclosed by reference. Particularly, the result of the detection method 200 of the present patent invention based on symbolic packet features can be combined with the result of the detection method based on numerical packet features in accordance with a combination algorithm comprising, as an example, logical operations, e.g., OR and AND.

According to another example of the present invention, relating to all four embodiments described above, each elementary time interval ΔT can contain a number of aggregated discrete values of the symbolic feature chosen, instead of only one discrete value. As indicated above, the data aggregation can be performed by the aggregation module 103. It is observed that, in this case, timings of individual discrete values within ΔT can be regarded as irrelevant. Since all the above described concentration measures depend only on the numbers of occurrences of discrete values in the moving windows considered, and not on their order, the proposed methods in the first and second embodiments, using sliding windows can be easily applied to aggregated data, whereas the method of the third embodiment, using moving windows and exponentially weighted averages, can be adapted to deal with the aggregated data. More precisely, instead of the binary value-indicator vectors $(\vec{\lambda}_i)_{i=1}^{\infty}$ corresponding to individual discrete values at given times, at each time corresponding to an elementary time interval ΔT, the average value-indicator vector is computed, as the arithmetic mean of all the binary value-indicators in this interval, and then further processed in the same way as above. This average value-indicator vector equivalently represents a relative frequency vector corresponding to the elementary time interval considered, as in the sliding window methods described with reference to the first and second embodiments.

Fifth Embodiment

A fifth embodiment refers to the same definition of sliding windows as described in relation to the first embodiment 300 (FIG. 4), but employs computation algorithms different from the ones described with reference to the first embodiment 300. It is observed that according to the first embodiment 300 the relative frequencies $f_{k,j}$ and the chosen concentration quantities $C_j$ are repeatedly computed for overlapping segments that may have a lot of data samples in common.

According to the fifth embodiment, instead of recomputing the chosen concentration measure for each new sliding segment, the relative frequencies $f_{k,j}$ and the concentration quantities $C_j$ already computed for the preceding segment are being updated so as to save in computations. With reference to the data memory requirements, also for the fifth embodiment all the data samples belonging to a preceding sliding window for which the concentration measure was previously computed need to be stored.

As described with reference to the first embodiment 300 described above, a first sliding segment $(x_i)_{i=m_j-n_j+1}^{m_j}$ and a successive second sliding segment $(x_i)_{i=m_{j+1}-n_{j+1}+1}^{m_{j+1}}$ can be expressed by (1) and (16), respectively. Then the number of samples from the second segment (16) not included in the first segment is thus $m_{j+1}-m_j$ whereas the number of samples from the first segment (1) not included in the second segment is $m_{j+1}-m_j-n_{j+1}+n_j$. If $n_{j+1} \neq n_j$, then these two numbers are different.

In accordance with the fifth detection method, for each $1 \leq k \leq m$, the absolute frequency $F_{k,j}$ is updated into $F_{k,j+1}$ by inspecting only the two non-overlapping parts of the two segments $(x_i)_{i=m_j+1}^{m_{j+1}}$ and $(x_i)_{i=m_j-n_j+1}^{m_{j+1}-n_{j+1}}$ and by adding the count, $F_{k,j+1}^{new}$, of the value $a_k$ in $(x_i)_{i=m_j+1}^{m_{j+1}}$ and by subtracting the count, $F_{k,j}^{old}$, of the value in $a_k$ in $(x_i)_{i=m_j-n_j+1}^{m_{j+1}n_{j+1}}$. More precisely, the following update expression is computed:

$$F_{k,j+1} = F_{k,j} + F_{k,j+1}^{new} - F_{k,j}^{old}. \qquad (30)$$

Instead of recomputing $F_{k,j}^{old}$, a previously computed and memorized value $F_{k,j''}^{new}$, can be computed provided that T is an integer multiple of τ. Then, the updated relative frequencies are computed as $f_{k,j+1} = F_{k,j+1}/n_{j+1}$. Similarly, $m_j^{eff}$ can be updated into $m_{j+1}^{eff}$. Finally, the updated concentration measures can be computed by using any of the expressions (4), (5), (8), (10), (11), or (12).

Alternatively, the quadratic concentration measures (4), (5), (8), or (10) can be directly updated. Namely, expression (10) can be updated by the following formula:

$$C_{j+1} = C_j + (n_{j+1} - n_j) - (m_{j+1}^{eff} - m_j^{eff}). \qquad (31)$$

The expressions (4) and (5) can be updated by:

$$C_{j+1} = C_j + \sum_{k=1}^{m} (f_{k,j+1} - f_{k,j})(f_{k,j+1} + f_{k,j}) \qquad (32)$$

which, if the numbers of samples are equal, i.e., $n_{j+1}=n_j$, reduces to $$C_{j+1} = C_j + \sum_{k=1}^{m} \frac{(F_{k,j+1}^{new} - F_{k,j}^{old})}{n_j} (f_{k,j+1} + f_{k,j}), \qquad (33)$$

whereas expression (8) can be updated analogously.

Sixth Embodiment

A sixth embodiment refers to sliding windows of the type described for the second embodiment (FIG. 6), but employs computation algorithms different from the ones of the second embodiment. For the second embodiment described above, the concentration measures are computed and compared for two overlapping segments $(x_i)_{i=m_{j+1}-n_j+1}^{m_{j+1}}$ and $(x_i)_{i=m_{j+1}-n_{j+1}+1}^{m_{j+1}}$ given by the expressions (22) and (23), respectively, for each j=1,2,3, ....

According to this sixth embodiment, the concentration measures $\hat{C}_j$ for the shortened sliding segments $(x_i)_{i=m_{j+1}-n_{j+1}+1}^{m_j}$, for j=1,2,3, ..., is computed by using the update expressions (31)-(33) given above, which are adapted to deal with the shortened sliding windows.

Then, for each j=1,2,3, ..., the concentration measure $C_{j+1}$ for the segment $(x_i)_{i=m_{j+1}-n_j+1}^{m_{j+1}}$ is computed by updating the computed concentration measure for the segment $(x_i)_{i=m_{j+1}-n_j+1}^{m_{j+1}}$, by using:

$$C_{j+1} = \hat{C}_j + \sum_{k=1}^{m} (f_{k,j+1} - \hat{f}_{k,j})(f_{k,j+1} + \hat{f}_{k,j}) \qquad (34)$$

together with $F_{k,j+1} = \hat{F}_{k,j} F_{k,j+1}^{new}$ and $f_{k,j+1} = F_{k,j+1} 1/n_{j+1}$, as in this case $\hat{F}_{k,j}^{old} = 0$.

It is observed that for all the above described embodiments, the underlying expectation is that the change of the concentration measure from one moving window to another may be much smaller for normal traffic than when there is a change from normal into anomalous traffic. With reference to different types of attacks and the concentration measure behavior, the following exemplary situations may occur. A first situation is a DDoS attack with randomly spoofed source IP addresses, when the concentration measure of these addresses tends to decrease considerably. A second situation is a DDoS attack that utilizes randomly spoofed source email addresses or SIP URIs. A third situation is a port scanning attack, when the concentration measure of the destination port numbers may decrease significantly. A fourth situation is a SPAM or SPIT attack using random destination email addresses or SIP URIs, respectively. A fifth situation is a massive malicious software attack targeting random destination IP addresses. A sixth situation is a message or request flooding DDoS attack, when the concentration measure of (possibly quantized) packet sizes tends to increase considerably, due to repeatedly sending essentially the same or similar packets. In particular, one may consider two-dimensional symbolic data features and the average conditional concentration measure of destination email addresses or SIP URIs in order to detect SPAM or SPIT attacks, respectively, or the average conditional concentration measure of source email addresses or SIP URIs in order to detect DDoS attacks.

The findings and teachings of the present invention show many advantages. Theoretical considerations of the Applicant have shown that the proposed various concentration measures and the corresponding variation quantities result in a powerful and general method for reliable detection of anomalous changes in network traffic data.

Moreover, it should be observed that the example of FIG. 2 and the other described embodiments can be implemented by avoiding a comparison of the current traffic with a corresponding statistical model based on historical data, which is typical of prior art methods. It has to be noticed that if the estimated statistical model of the traffic does not reflect the normal traffic behavior sufficiently accurately, then it is difficult to achieve a satisfactory tradeoff between the false-positive and false-negative rates. Therefore, the possibility of performing a detection irrespective of statistical models, improves the reliability of the described detection methods in comparison with prior art techniques related to numerical or symbolic packet features.

Some prior art techniques propose the usage of certain entropy measures related to certain symbolic packet features such as the IP addresses (e.g., the Shannon entropy or the compression ratio of data compression), but fail short in providing a simple, general, and reliable method for detecting anomalous changes in these entropy measures (for example, see the above mentioned articles "Mining anomalies using traffic feature distributions", A. Lakhina, M. Crovella, and C. Diot, and "Entropy based worm and anomaly detection in fast IP networks", A. Wagner and B. Plattner). In this regard, the above described two overlapping sliding window techniques and the exponentially weighted moving average technique appear to be particularly advantageous.

The methods described above are mathematically relatively simple, sufficiently robust to changes inherent to normal traffic, and yet capable of detecting anomalous traffic due to attacks such as (D)DoS attacks, SPAM and SPIT attacks, and scanning attacks, as well as massive malicious software attacks. For example, the quadratic and other concentration measures together with the corresponding variation quantities according to the present invention do not require complex computations in contrast with the articles mentioned above. As such, the proposed detection method appears to be very suitable for high-speed and high-volume communications networks.

Furthermore, the proposed average conditional concentration measures for two-dimensional symbolic features offer particular advantages for detecting anomalous traffic due to various network attacks.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of detecting anomalies in a communication system, comprising:
   providing a first packet flow portion and a second packet flow portion;
   extracting samples of a symbolic packet feature associated with traffic status of the first and second packet flow portions;
   computing from said extracted samples a first statistical concentration quantity and a second statistical concentration quantity of the symbolic feature associated with the first and second packet flow portions, respectively, wherein computing said first and second statistical concentration quantities comprises:
      computing a sample number representing the number of samples associated with one of said first and second packet flow portions;
      computing relative frequencies;
      computing quadratic values from said relative frequencies; and
      computing a quadratic concentration measure, wherein the quadratic concentration measure comprises a sum of the quadratic values;
   computing from said concentration quantities a variation quantity representing a concentration change from the first packet flow portion to the second packet flow portion,
   comparing the variation quantity with a comparison value; and
   detecting an anomaly in the system in response to said comparison.

2. The detection method of claim 1, wherein:
   said first statistical concentration quantity is a first concentration measure of an estimated probability distribution of the extracted samples associated with the first packet flow portion; and
   said second statistical concentration quantity is a second concentration measure of an estimated probability distribution of the extracted samples associated with the second packet flow portion.

3. The detection method of claim 2, wherein the symbolic packet feature assumes values in a set of values and computing each of said first and second concentration quantities comprises:
   computing a sample number representing the number of samples associated with one of said first and second flow portion;
   computing an absolute frequency value representing a number of times a value belonging to said set is achieved; and
   computing relative frequencies of all values belonging to the set of values.

4. The detection method of claim 2, wherein the symbolic packet feature assumes values in a set of values and computing each of said first and second concentration measures comprising:
   computing a sample number representing a number of samples associated with one of said first and second flow portions;
   computing an effective number representing a total number of values achieved in said set; and
   computing a difference quantity from a difference between said sample number and said effective number.

5. The detection method of claim 1, wherein said variation quantity is related to a difference between the first statistical concentration quantity and the second statistical concentration quantity.

6. The detection method of claim 1, wherein providing said first and second packet flow portions comprises:
   defining a first time window comprising the first packet flow portion and an associated first sample segment of the symbolic feature; and
   defining a second time window comprising the second flow portion and an associated second sample segment of the symbolic feature,
   wherein said first statistical concentration quantity and said second statistical concentration quantity are computed from the first and second sample segments, respectively.

7. The detection method of claim 6, wherein the first and second windows have a same time length.

8. The detection method of claim 6, further comprising, after a time interval equal to a delay:
   defining further first and second windows by sliding the first and second windows by said delay; and
   repeating the method to detect an anomaly applying the method to further first and second packet flow portions corresponding to said further first and second windows, respectively.

9. The detection method of claim 6, wherein the first sample segment comprises an initial part of the second sample segment, the second sample segment comprising an end part which is separate from the first segment.

10. The detection method of claim 9, further comprising, after a time interval equal to the delay:
    defining further first and second sample segments by sliding the first and second sample segments by said delay; and
    repeating the method to detect an anomaly applying the method to further first and second sample segments.

11. The detection method of claim 1, wherein extracting samples of a symbolic feature comprises:
    extracting samples of a numerical feature; and
    converting said samples of a numerical feature into said samples of a symbolic feature.

12. The detection method of claim 11, wherein extracting samples of a numerical feature comprises selecting the numerical feature among a plurality of features comprising:
    packet size in bytes;
    total number of packets in a time interval of length;
    total number of layer 3 bytes in a time interval of length;
    average packet size in a time interval of length, expressed in bytes;
    packet rate in a time interval of length; and
    byte rate in a time interval of length.

13. The detection method of claim 1, further comprising:
    extracting further samples of a further symbolic packet feature associated with the first and second packet flow portions;
    computing from said further samples additional statistical concentration quantities of said further symbolic feature; and computing a further variation quantity representing another concentration change from the first packet flow portion to the second packet flow portion.

14. The detection method of claim 13, wherein computing from said concentration quantities a variation quantity representing a concentration change from the first packet flow portion to the second packet flow portion comprises:
computing a first variation quantity from said concentration quantities; and
combining the first variation quantity and the further variation quantity to obtain said variation quantity.

15. The detection method of claim 13, wherein comparing the variation quantity with a comparison value further comprises:
comparing the further variation quantity with a further comparison value; and
detecting an anomaly in the system in response to said comparison of the further variation quantity with the further comparison value.

16. The detection method of claim 1, further comprising:
extracting samples of a numeric packet feature associated with the first and second packet flow portions,
wherein detecting an anomaly in the system in response to said comparison comprises:
monitoring statistical behavior of said numeric packet feature associated with the first and second packet flow portions.

17. The detection method of claim 1, further comprising:
aggregating samples of a symbolic packet feature in elementary time intervals; and
applying the method to aggregated samples.

18. The detection method of claim 1, further comprising:
selecting the comparison value from a fixed value, a variable value, an adaptive value, or a value depending on historical traffic data.

19. The detection method of claim 1, wherein a detected anomaly is due to at least one of the following causes: a failure of a communication system element and an attack.

20. A non-transitory computer-readable medium storing a computer program product comprising program codes that, when executed, perform the detection method of claim 1.

21. An apparatus for detecting anomalies in a packet switched communication system, comprising:
a collection module configured to store samples of a symbolic feature associated with a traffic status of a first packet flow portion and a second packet flow portion;
a computing module configured to:
compute from said samples a first statistical concentration quantity and a second statistical concentration quantity of the symbolic feature associated with the first and second packet flow portions, respectively, wherein computing said first and second statistical concentration quantities comprises:
computing a sample number representing the number of samples associated with one of said first and second packet flow portions;
computing relative frequencies;
computing quadratic values from said relative frequencies; and
computing a concentration measure, wherein the measure comprises a sum of the quadratic values; and
compute from said concentration quantities a variation quantity representing a concentration change from the first packet flow portion to the second packet flow portion; and
a detection module configured to:
compare the variation quantity with a comparison value; and
detect an anomaly in the system in response to said comparison.

22. The apparatus of claim 21, further comprising a flow aggregation module capable of grouping numerical packet feature values of different network flows according to selected packet parameters.

23. A packet switched communication system comprising:
an extractor module capable of extracting samples of a symbolic packet feature associated with a traffic status of a first packet flow portion and a second packet flow portion; and
an apparatus capable of detecting anomalies connected to said extractor module and arranged in accordance with the apparatus of claim 21.

* * * * *